Patented Oct. 10, 1922.

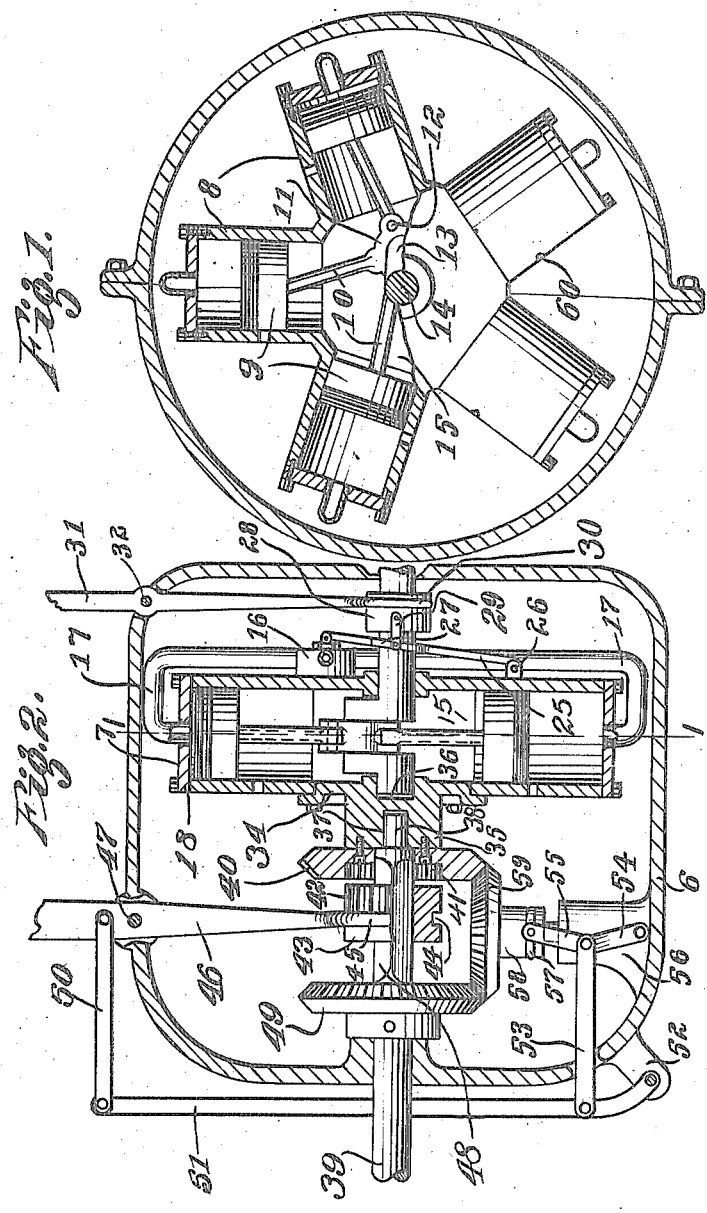

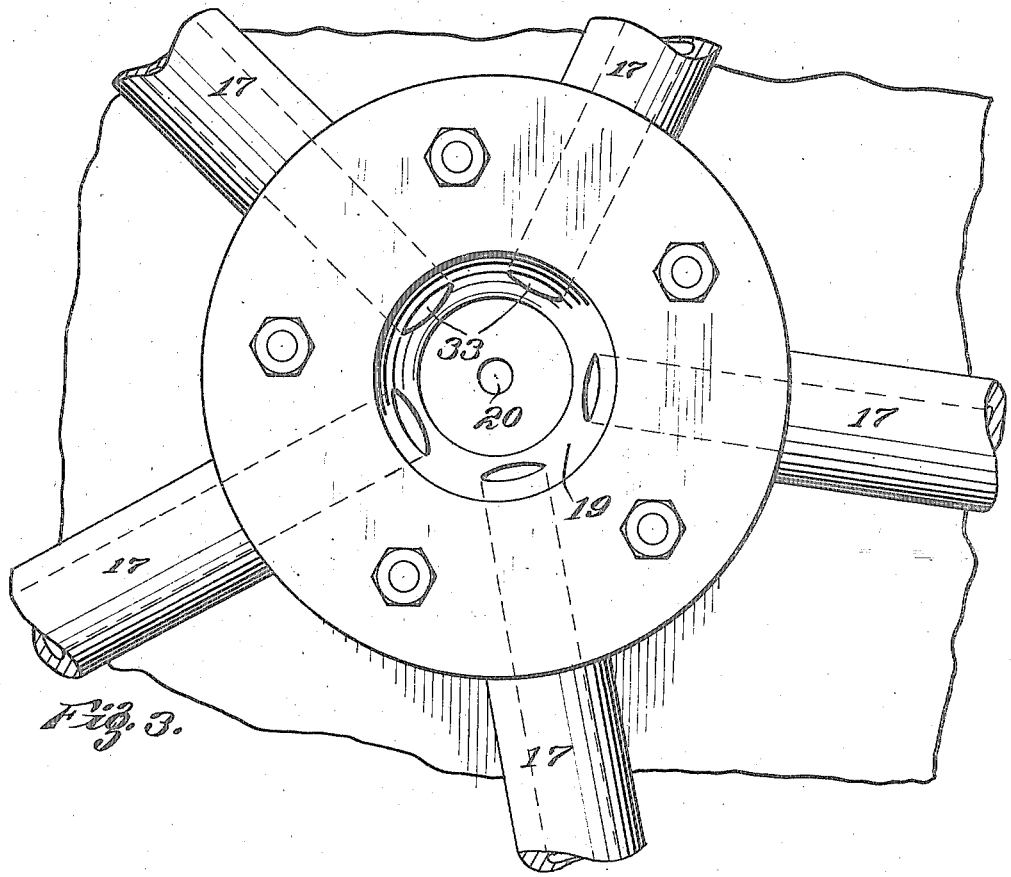
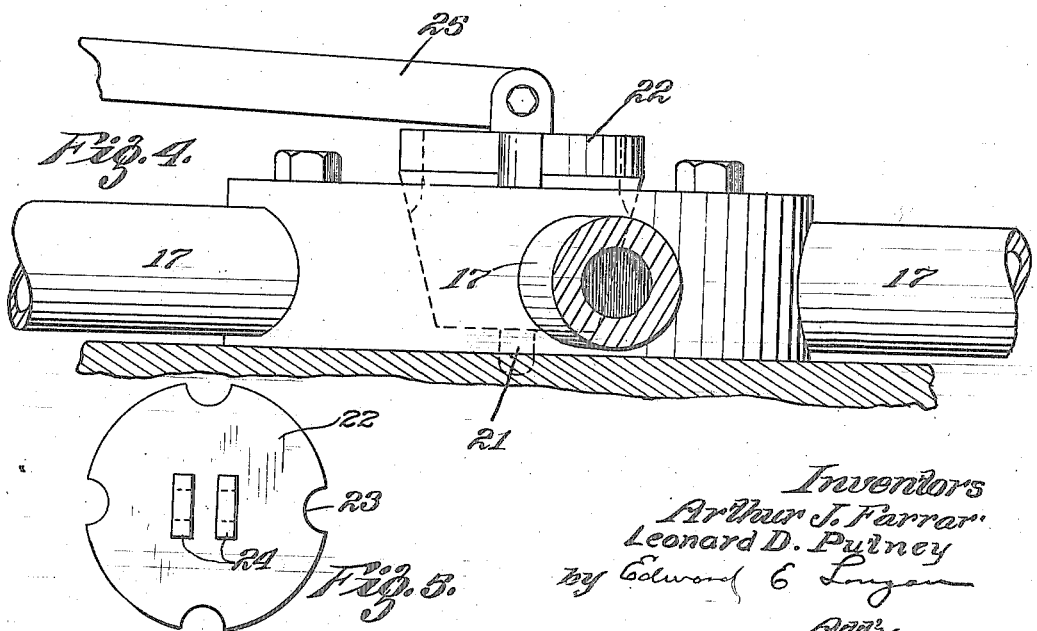

1,431,642

UNITED STATES PATENT OFFICE.

ARTHUR J. FARRAR AND LEONARD D. PUTNEY, OF ST. LOUIS, MISSOURI; SAID PUTNEY ASSIGNOR TO FRANCES E. AUSTIN, OF ST. LOUIS, MISSOURI.

FLUID TRANSMISSION.

Application filed February 14, 1920. Serial No. 358,795.

*To all whom it may concern:*

Be it known that we, ARTHUR J. FARRAR and LEONARD D. PUTNEY, citizens of the United States of America, and residents of the city of St. Louis and State of Missouri, have jointly invented certain new and useful Improvements in Fluid Transmissions, of which the following is a specification, containing a full, clear, and exact description, reference being had to the accompanying drawings, forming a part thereof.

Our invention relates to improvements in fluid transmissions, and has for its primary object a transmission designed to be attached to a motor vehicle which is controlled by fluid pressure and vacuum, and so arranged that any desired speed can be obtained that is, from nothing to the highest speed which the vehicle is capable of being driven by the engine.

A further object is to construct a transmission for motor vehicles which is locked by means of fluid pressure and vacuum, said fluid being preferably air.

A still further object is to construct a fluid transmission for motor vehicles, and which is so constructed that we may, if desired, eliminate the clutch between the engine and the transmission, although preferably we retain this clutch in event that sudden stopping becomes necessary.

A still further object is to construct a fluid transmission for motor vehicles by means of which the power from the driving means can be gradually and constantly applied to the driven means in increasing quantities, and thus impart no sudden shocks on the driving mechanism or the vehicle.

In the drawings:

Fig. 1 is a view of our improved device, taken on the line 1—1 of Fig. 2, with parts thereof broken away and in section;

Fig. 2 a vertical longitudinal section of the same;

Fig. 3 a top plan view of the relief valve made use of, with portions of the connecting pipes attached thereto;

Fig. 4 a side view of the same; and

Fig. 5 a top plan view of the relief valve plunger.

In the construction of our device, we make use of a casing 6, in which is revolubly mounted the fluid transmission member 7. This fluid transmission member consists of a plurality of cylinders 8 which are built around a common center, and extend radially therefrom.

In the cylinders 8 are mounted pistons 9 which are connected to the connecting rods 10. These connecting rods 10 are in turn pivotally secured to a collar 11 by means of pins 12. The collar 11 is mounted on the arm or crank 13 of the shaft 14, which shaft is connected to the engine. This connection may be either by means of a friction clutch or by a rigid coupling.

The crank 13 is located within a housing forming the chamber 15 from which the cylinders 8 radiate. On one of the cylinder walls and towards the front of the machine is secured a valve 16. This valve is of the multi-port type, the number of ports corresponding to the number of cylinders.

Each of the cylinders is connected to its corresponding port by means of a pipe connection 17 which is secured in the head 18 of the cylinder. The valve 16 is provided with a truncated conical central bore 19, into which the pipes 17 open. At the bottom of this bore is a smaller central bore 20, and into this central bore the projection 21 of the valve plunger 22 is located, the object of this plunger being to prevent the valve plunger from oscillating or moving in other than a lateral direction when the plunger is unseated from the conical bore 19.

This valve plunger is provided for a portion of its length with recesses 23 so as to allow a free escape of fluid when the valve is unseated. On the outer face of the valve plunger 22 we provide a pair of perforated ears 24, into which one end of a lever 25 fits.

Diametrically opposite the valve 16 and removed at some distance from the center of the transmission, we provide a perforated ear 26, into which the opposite end of the lever 25 is secured. The lever 25 is provided with a looped portion between its ends as indicated by the numeral 27. This will allow the lever to straddle the shaft 14. On the shaft 14 is loosely mounted a collar 28, which collar is connected to the lever 25, at its looped portion, by means of links 29. The collar 28 is provided with a circumferential groove into which the forked end 30 of a lever 31 fits. This lever is pivoted to the casing at the point indicated by the numeral 32, and is for the purpose of moving the valve plunger 22 backward and forward so as to entirely close or gradually open the ports 33 formed in the valve 16. The chamber 15 is closed on its rear side as indicated by the numeral 34, and is provided with an extending boss 35. This boss is provided with a pair of central bores 36 and 37, these bores extending only partially through the boss from each side, the bore 36 acting as a bearing for the crank shaft 14 and the bore 37 as a bearing for the reduced portion 38 of the propeller shaft 39.

Secured to the boss 35 is a bevelled gear 40. This gear is so fixed as to revolve only with the cylinders, and has no direct connection, whatever, with the shaft 39. The bevelled gear 40 is also provided with a toothed recess 41, with which teeth 42 of a sliding collar 43 mesh. This sliding collar is provided with a groove 44, into which the fork 45 of the lever 46 fits. This lever is pivotally secured to the casing 6 at the point 47.

The shaft 39 is made square as indicated by the numeral 48 at the point adjacent the reduced portion 38, and on this squared portion the collar 43 is placed. At the rear of the squared portion 48 is a second bevelled gear 49, this gear being securely attached to the shaft 39.

Secured to the lever 46 and above the pivot point 47 is pivotally attached one end of a link 50, the opposite end of the link 50 being likewise attached to a lever 51 which has its opposite end pivotally secured to a lug 52 which projects from the casing 6. At a short distance above the lug 52 is a lever 53 which has its one end pivoted to the lever 51. This lever extends through the casing 6 and has its opposite end pivotally attached to a pair of levers 54 and 55, the lever 54 being pivotally mounted on the boss 56, the other lever 55 secured to a ring 57 which is fitted in a groove cut in the hub 58 of the bevelled gear 59. The purpose of this gear is to impart a reverse movement to the vehicle, and the object of the lever connection is that the forward and reverse drive work simultaneously, in that when the collar 43 is thrown forward, the bevelled gear 59 is lowered and brought out of mesh with the gears 40 and 49, and when the lever 46 is operated so as to withdraw the collar 43 from its engagement, the bevelled gear 59 is raised and brought in mesh with the two bevelled gears 40 and 49.

In the walls of the cylinders 8 are perforations 60, these perforations, as will be noted in Fig. 1, are so positioned that when the piston is at its lowest point the perforation is above the piston. The object of this is to eliminate any possibility of a partial vacuum being formed in the cylinder when the piston is at its lowest point. The perforations are also left uncovered when the piston is travelling upward to its highest point. This will allow ingress of air into the interior of the crank chamber and prevent the formation of a vacuum therein, but will allow a partial vacuum to be formed in those cylinders in which the perforations 60 are covered by the pistons. These perforations are also useful in preventing the pistons from taking hold too rapidly when the valve is closed, and allows the pistons to yieldingly take hold so that the clutch will not start the car with a jerk and place undue strain on the engine and driving parts.

The operation of my device is as follows: When it is desired to start the car, the valve plunger 22 is withdrawn from its seat and the engine started. This will revolve the crank shaft and consequently the pistons 9 will be reciprocated in the cylinders 8, and the fluid between the cylinder head and the piston forced through the pipes 17 and out through the valve 16. As the valve 16 is gradually closed by forcing the plunger 22 inwardly, the escape of the fluid is retarded gradually, and consequently the cylinders commence to travel with the crank shaft, commencing slowly at first and gathering speed as the valve is closed farther. This gathering of speed will continue until the valve plunger is entirely seated, after which no escape of fluid from the cylinders is possible, and the entire transmission will then revolve at the engine speed. In this construction it will be seen that no gears are made use of for the forward drive, thus eliminating one of the main wearing parts of a machine; neither is there any danger of stripping gears, as the only time that gears are used is in the reverse.

When the pistons reciprocate within the cylinders, the air is drawn through the valve ports into the cylinders on the one side of the crank shaft and discharged by the cylinders on the other side, thus the valve 16 serves the two-fold purpose of acting as an intake and discharge regulating valve. This also assists greatly in locking the pistons when the valve is closed, as there can be no admission of air by suction after this action has once taken place and any suction movement of the pistons is prevented by the formation of a vacuum, which will hold the pistons in place thus eliminating the use of a pressure tank.

When it is desired to use oil, or a similar fluid, the casing 6 is provided with a gland where the lever 53 passes through so that the lever may be packed and the leakage of oil from the casing prevented.

Having fully described our invention, what we claim is:

1. A fluid transmission for motor vehicles, comprising a casing, a shaft mounted in each end of the casing and extending partially through the casing, a crank formed integral with one of said shafts and adjacent the end thereof, a plurality of radially disposed cylinders having perforations in their walls revolubly mounted on said shaft and around the crank, pistons located in said cylinders, a collar located on said crank, connecting rods for connecting the pistons to the collar, a valve having a tapered seat and a plurality of ports located on one side of the cylinders, pipes connected to the ports and cylinder heads, a tapered reciprocating plunger mounted in the valve, and a lever for operating the reciprocating plunger.

2. A fluid transmission for motor vehicles, comprising a casing, a shaft mounted in each end of the casing and extending partially through the casing, a crank formed integral with one of said shafts and adjacent the end thereof, a plurality of radially disposed cylinders having perforations in their walls revolubly mounted on said shaft and around the crank, pistons located in said cylinders, a collar located on said crank, connecting rods for connecting the pistons to the collar, a valve having a tapered seat and a plurality of ports located on one side of the cylinders, pipes connected to the ports and cylinder heads, a reciprocating plunger having grooves mounted in the valve, and a lever for operating the reciprocatinge plunger.

3. A fluid transmission for motor vehicles comprising a casing, a crank shaft located therein and extending through one end thereof, a housing revolubly mounted on said shaft and enclosing said crank, a plurality of radially disposed cylinders having perforations in their walls, mounted on the housing, pistons located in the cylinders, a collar mounted on the crank of the crank shaft, connecting rods connecting the pistons and the collar, a valve having a plurality of ports located on said housing, pipes communicating with said ports and opening into the heads of the cylinders, a second shaft extending through the opposite end of the casing, its one end operatively connected to the housing, a reciprocating plunger having grooves mounted in the valve, and a lever for operating the reciprocating plunger.

In testimony whereof, we have signed our names to this specification.

ARTHUR J. FARRAR.
LEONARD D. PUTNEY.